May 13, 1969
W. J. PETERS
3,444,363
ETERNAL LIGHT MEMORIAL STRUCTURE
Filed May 26, 1966
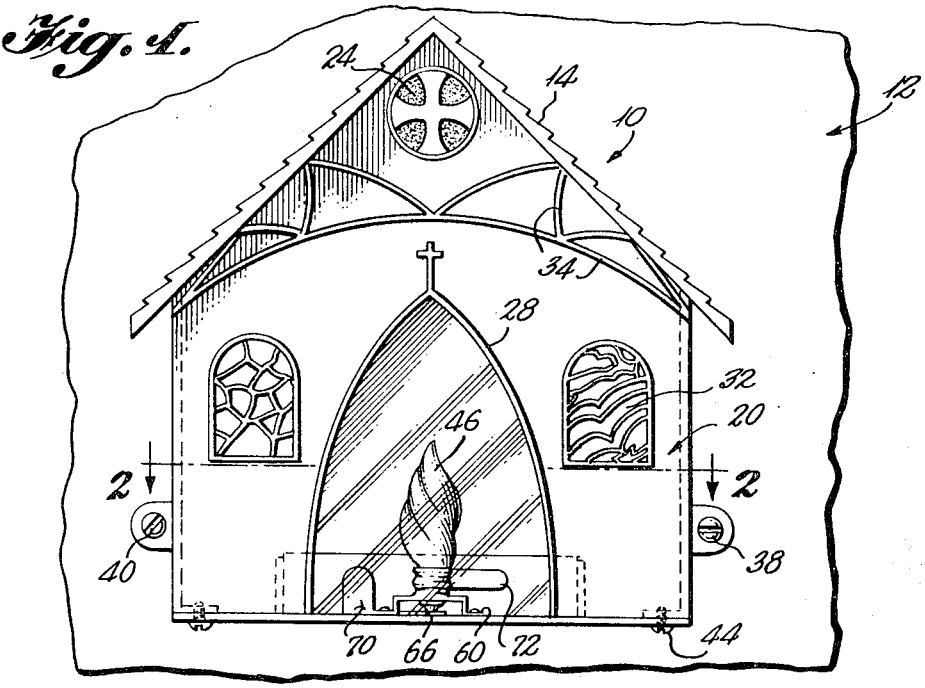
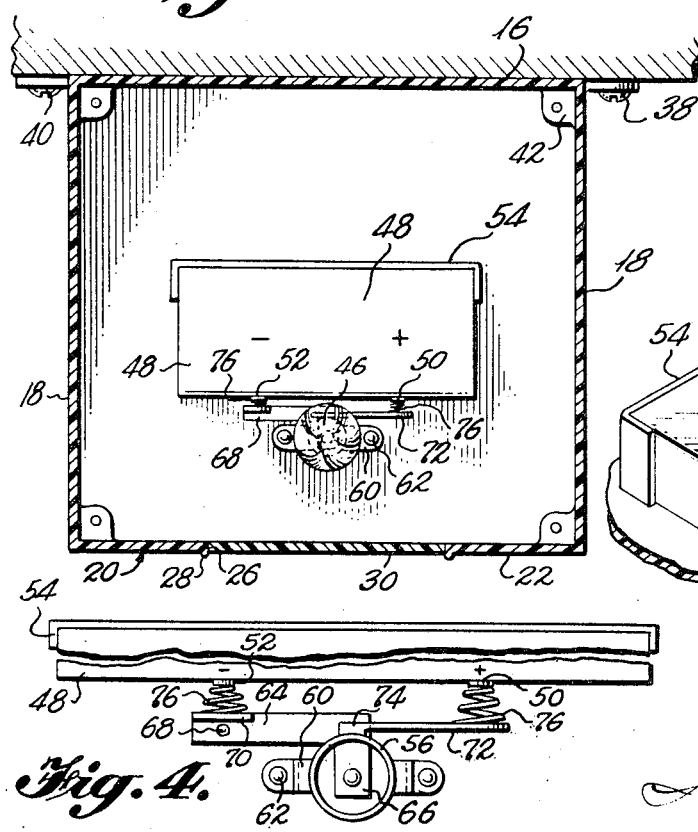
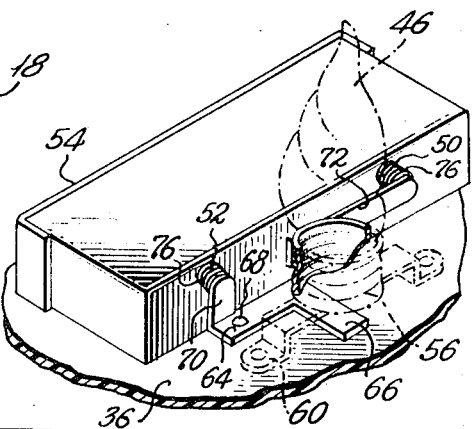
INVENTOR.
William J. Peters
BY
Shoemaker and Mattare
ATTORNEYS United States Patent Office 3,444,363
Patented May 13, 1969

3,444,363
ETERNAL LIGHT MEMORIAL STRUCTURE
William J. Peters, Grass Valley, Calif., assignor to
E.F.L., Inc., a corporation of Delaware
Filed May 26, 1966, Ser. No. 553,201
Int. Cl. F21p 1/02
U.S. Cl. 240—10　　　　　　　　　　　　　2 Claims

ABSTRACT OF THE DISCLOSURE

The perpetual light memorial structure includes a housing simulating a church in shape with a transparent door panel and having a removable bottom wall forming a floor in which is mounted means for supporting a battery on its side and an incandescent light socket between the battery and transparent door. Yieldable electrical connections are provided between the poles of the battery and the side and bottom respectively of the light socket.

---

This invention relates to new and novel improvements in memorial devices or structures for perpetuating the memory of a deceased person and is directed particularly to an improved device of this character having means to be maintained continuously or perpetually lighted or illuminated in the nature of an eternal or perpetual flame light.

A particular object of the present invention is to provide a memorial device or structure of the character stated which is adapted to be mounted upon and secured to a wall or other structural part of a crypt or mausoleum and which is formed to provide a housing or enclosure for a lighting means.

A further object of the invention is to provide a memorial device of the character described, formed to simulate a religious structure or building such as a chapel or the like, having a front wall in imitation of the facade of a religious structure, which is in part transparent or light emitting and wherein the structure forms a housing for a perpetual light device representing or having the appearance of a flame viewable fully or partly through the light transmitting front or facade portion of the structure.

A still further object of the invention is to provide a memorial device of the character stated, adapted to be secured to the wall or other part of a crypt or mausoleum and having a removable wall portion carrying an incandescent lamp together with a battery or other source of electrical energy or power and wherein a front wall of the structure is designed to transmit light from the lamp and present to a view, the suggestion of a flame.

The invention generally comprises a housing structure in the form of a small chapel building or church building, formed of glass, transparent or translucent plastic or the like and designed to be secured to a wall of a crypt or mausoleum. The facade of the church or chapel simulating housing has an area representing a doorway which is transparent or translucent so that a light within the housing may be seen therethrough. The floor or bottom wall of the housing is removable and carries means for supporting an electric incandescent lamp and a source of energy such as a battery or the like, whereby when the housing is fixed or mounted in a position of use access may be readily had to the interior by removing the bottom or floor portion for servicing the light and battery.

The invention will be best understood from a consideration of the following detailed description taken in connection with the accompanying drawings forming a part of the specification, with the understanding that the invention is not confined to a strict conformity with the showing of the drawings but may be changed or modified within the scope of the appended claims.

In the drawings:

FIG. 1 is a view in front elevation of a perpetual light memorial structure constructed in accordance with a preferred form of the present invention.

FIG. 2 is a horizontal section taken substantially on the line 2—2 of FIG. 1 showing the battery or source of electrical energy and the incandescent lamp mounting means in position upon the removable bottom wall or floor of the structure.

FIG. 3 is a view in perspective, on an enlarged scale, of the electrical units shown in FIG. 2.

FIG. 4 is a view in top plan, on an enlarged scale, of a portion of the electric battery and the incandescent lamp support and electrical contact elements associated therewith and with the battery.

Referring now more particularly to the drawings, the numeral 10 generally designates a housing structure designed or formed to simulate a religious building such as a chapel or the like, in which the hereinafter described lighting means is installed.

The numeral 12 generally designates a wall or other body upon which the structure 10 is mounted or secured for use. This structural wall may be part of a crypt or mausoleum upon which plaques, religious emblems or the like are customarily mounted.

The structure 10 may be of any size or dimensions and without intending to limit the same in any manner, it may be set forth that preferable dimensions for the structure would be an overall height of from 7 to 8 inches with a width of approximately 6 inches and a depth from front to back of from 5 to 6 inches.

The housing or chapel building simulating structure may be formed either throughout or in part of a suitable transparent or translucent material such as a glass, plastic and the like, the structure here illustrated being sectioned for plastic.

As shown, the structure 10 embodies the roof 14, back wall 16 and side walls 18, the facade 20 embodying the wall 22.

The roof portion 14 is of gable form and in the apex portion thereof the front wall 22 is preferably provided with a light as at 24 of the form illustrated, the surface of which may be etched or otherwise treated to form a design in the nature of a religious symbol or a suitable emblem or the like. As the material of the wall 22 would be of glass, plastic or the like which would transmit light from the interior of the housing, such etching or other illumination would stand out clearly to the view.

The central part of the front wall 22 has a door opening as indicated at 26 outlined or framed as indicated at 28 and the structural material of the wall within this frame, is indicated at 30 and is preferably transparent as shown. The door material 30 may be formed of glass or plastic so that the hereinafter described structure within the housing may be seen either clearly or in outline, particularly the element representing the eternal light flame.

At opposite sides of the door the front wall may be provided with suitable framed designs 32 simulating leaded windows or the like.

Other embossed designs may be provided on the wall 22 above the door and windows as indicated at 34.

The housing structure has a bottom wall or floor 36 which is removably secured to the other walls in a suitable manner whereby it may be removed and replaced as desired for the purpose hereinafter described.

As hereinbefore stated, the memorial structure is designed to be secured to a fixed support such as the wall 13 of a crypt or mausoleum and for this purpose there are here shown the outwardly projecting mounting ears 38 formed integral with the back wall 16 of the housing and in the plane of the latter, and apertured to receive securing screws or bolts 40 penetrating suitable openings in the wall surface to thereby secure the housing in operative position against the wall 12 or other structure.

The bottom wall or floor carries thereon the hereinafter described light fixture and energy cell or battery. For removably securing the bottom wall or floor 36 in position, there are here shown the lugs 42 formed integral with the front, side and back walls in the corners thereof and suitobly threaded to receive holding screws 44 which are inserted through properly located or positioned apertures in the floor 36 to register with the threaded apertures in the attaching lugs 44.

The light or flame simulating means comprises an electric incandescent bulb 46 supported in upright position inwardly of the central portion of the front door panel 30 and behind this light producing element means is provided for properly locating and holding in position a suitable electrical energy producing cell or battery as indicated at 48.

The battery unit 48 is of a readily obtainable type which has the positive and negative terminals or posts 50 and 52 thereof projecting from or along one longitudinal side as shown and this energy source is disposed on its side upon the floor 36 with the terminals thereof directed forwardly as shown and disposed in a line passing behind the mounting for the electric light unit 46.

The numeral 54 designates a positioning and holding bracket against which the bottom part of the battery unit is positioned for use.

The numeral 56 designates the screw threaded metal socket into which may be screwed the threaded base of the incandescent lamp 46.

The lamp socket 56 is mounted in a suitable manner at the forward side of the battery 48, such mounting here being illustrated as having the arms 58 projecting laterally from opposite sides of the shell or socket 56 and turned down and then extending outwardly to form the supporting feet 60 which rest upon and are secured by rivets or other suitable means 62 to the floor 36. These arms thus in effect form, together with the attached socket or shell, a bridge which is elevated from the floor 36.

The numeral 64 designates a resilient conductor plate or strip which has a terminal 66 disposed upon the floor beneath the raised lower end of the socket 56. This conductor plate or strip may be secured in a suitable manner to the floor as by means of a rivet or rivets 68 and it has an opposite end portion which is disposed upwardly to form the contact arm 70 which is positioned adjacent to a terminal of the battery, such terminal being here designated or shown as the negative terminal 52.

The base portion of the incandescent lamp, when threaded downwardly into the socket, will make electrical contact with the terminal 66 as will be readily seen from the illustration of FIG. 1.

The numeral 72 designates a second conductor plate which has a fixed electrical connection, as at 74, to the metallic shell or socket 58. This conductor plate extends laterally in the opposite direction from the plate 64 and has its outer end positioned adjacent to the other battery terminal designated 50, this other terminal being the positive terminal of the battery.

In order that a firm electrical contact may be established between the ends of the conductor plates 64 and 72, the arm 70 and the outer end of the plate 72 may have secured thereto the short metal spring elements 76. Thus it will be seen that the procedure of placing the battery 48 in position consists in placing the terminals of the battery against the respective springs 76 and then pressing outwardly on the battery to compress the springs so as to permit the inner or bottom part of the battery to drop into position against the bracket 54. Thus a positive electrical connection will be established between the conductor strips and the battery terminals whereby when the incandescent lamp 46 has the base thereof threaded into the metal socket 58 an electric circuit will be established from one terminal or pole of the battery to and through one of the conductor strips, such as the strip 72, to the shell or socket 56 and from this into and through the filament of the lamp and then to the central contact of the lamp base to the other conductor strip 64 back to the opposite terminal of the battery.

When the eternal or perpetual light structure is set up in operative position and the floor 36 is secured to the bottom part of the housing structure, carrying the battery and other elements described, it will be seen that the energized light bulb, being positioned inwardly from the central portion of the transparent or translucent door panel 30, will illuminate the housing and will, particularly, show a light glow through the door panel. Thus the memorial device will provide the desired unique and attractive memorial light or what is more generally referred to as an eternal or perpetual light.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. A perpetual light memorial structure comprising a housing having front, back and side walls, a top wall, and a bottom wall forming a floor, said housing being in simulation of a church, said front wall having medially positioned a light transmitting section of a configuration and design simulating a door, means within the housing in alignment with said door forming a lighting system mounted upon a portion of said floor, said means comprising a bracket secured to said floor, positioning and contacting the bottom side of a battery, an incandescent light socket secured to the floor at the top side of the battery between positive and negative poles thereof and between said battery and said front wall, a first electric current conducting means consisting of an elongate element secured to said floor with one end terminal thereof lying beneath the center of said socket and having its opposite terminal disposed vertically in opposed relation with one of said poles of said battery, a second electric current conducting means consisting of an elongate element having one end terminal thereof joined to said socket and having its opposite terminal thereof in opposed relation with the other pole of the battery, and the said electrical connection between said opposite terminal of each of said elongate elements and the opposed pole of the battery consisting of a yieldable pressure applying current conducting element, and said lighting system supporting portion of said floor being removably secured to the adjacent walls to provide access to the interior of the housing.

2. A perpetual light memorial structure, comprising a housing having front, back and side walls, a top wall, and a bottom wall forming a floor, said housing being in simulation of a church, said front wall having a light transmitting section of a configuration and design simulating a door, means within the housing forming a lighting system, and means providing access to the interior of the housing for servicing said lighting system, a self-contained source of electrical potential, means on said floor for maintaining said source of electrical potential in operative position thereon, means forming an incandescent lamp base receiving socket in a certain position relative to said source of potential maintaining means, a first electric current conducting means having an end terminal positioned relative to said socket for engagement by one terminal of an incandescent lamp in said socket, a second electric current conducting means having an end terminal in electrical connection with said socket for electrical connection with a second terminal of an incandescent lamp in said socket, said first electric current conducting means having an opposite terminal positioned for electrical connection with a pole of one sign of said source of electrical potential, and said second electric current conducting means having an opposite terminal positioned for electrical contact with the pole of opposite sign of said source of electrical potential whereby said source of potential and said incandescent lamp are operatively connected in a closed electric circuit, said means for maintaining said source of potential comprising a bracket fixed to said floor in spaced relation with and inwardly from said front wall light transmitting section, said self-contained source of electrical potential having one side positioned against said bracket and having positive and negative terminals at the opposite side, said position for the said incandescent electric lamp base receiving socket being upon said floor forwardly of said opposite side of said source of electrical potential, said first electric current conducting means consisting of an elongate element secured to said floor with the said end terminal thereof lying beneath the center of said socket and having the said opposite terminal disposed vertically in opposed relation with the said pole of one sign of the source of potential, said second electric current conducting means consisting of an elongate element having said end terminal thereof joined to said socket and having the said opposite terminal thereof in opposed relation with the said pole of opposite sign of the source of potential, and the said electrical connection between said opposite terminal of each of said elongate elements and the opposed pole of said source of electrical potential consisting of a yieldable pressure applying current conducting element.

References Cited

UNITED STATES PATENTS

| | | | |
|---|---|---|---|
| 1,546,089 | 7/1925 | Leachman et al. | 240—10 |
| 2,164,378 | 7/1939 | Berwick | 240—10 |
| 2,745,948 | 5/1956 | Prest | 240—10 |
| 2,821,621 | 1/1958 | Allunario | 240—10 |

NORTON ANSHER, *Primary Examiner.*

DAVID B. WEBSTER, *Assistant Examiner.*

U.S. Cl. X.R.

240—6.4, 10.6